(12) United States Patent
Im et al.

(10) Patent No.: US 9,491,210 B2
(45) Date of Patent: Nov. 8, 2016

(54) SINK DEVICE, SOURCE DEVICE AND METHOD FOR CONTROLLING THE SINK DEVICE

(71) Applicant: Pantech Co., Ltd., Seoul (KR)

(72) Inventors: Won Jin Im, Seoul (KR); Chun Hyung Park, Seoul (KR); Oh Seob Lim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 240 days.

(21) Appl. No.: 14/074,250

(22) Filed: Nov. 7, 2013

(65) Prior Publication Data

US 2014/0181308 A1    Jun. 26, 2014

(30) Foreign Application Priority Data

Dec. 21, 2012    (KR) ........................ 10-2012-0150640

(51) Int. Cl.
*H04L 29/06*        (2006.01)
*H04L 29/08*        (2006.01)

(52) U.S. Cl.
CPC ....... *H04L 65/4084* (2013.01); *H04L 65/4092* (2013.01); *H04L 67/125* (2013.01)

(58) Field of Classification Search
CPC .................................................... G06F 3/041
USPC ......................................................... 709/226
See application file for complete search history.

(56) References Cited

U.S. PATENT DOCUMENTS

| 2009/0172757 | A1* | 7/2009 | Aldrey ................... H04N 7/165 |
| | | | 725/110 |
| 2013/0009887 | A1* | 1/2013 | Huang ................ H04L 65/4092 |
| | | | 345/173 |
| 2013/0304794 | A1 | 11/2013 | Verma et al. |

FOREIGN PATENT DOCUMENTS

KR    10-2012-0082846    7/2012

* cited by examiner

*Primary Examiner* — David Lazaro
*Assistant Examiner* — Zia Khurshid
(74) *Attorney, Agent, or Firm* — H.C. Park & Associates, PLC

(57) ABSTRACT

A sink device, a source device, a Wireless Local Area Network (WLAN) system, and a method for controlling the sink device are described. A sink device includes: an event setting unit that sets a control event configured to control media data supplied from a remote source device with which the sink device communicates through a WLAN; a packet control unit that forms a control packet configured to transmit the control event to the source device; a communication unit that transmits the control packet to the source device and receives, from the source device, media that reflects the control event; and a media output unit that outputs the media data that reflects the control event.

29 Claims, 13 Drawing Sheets

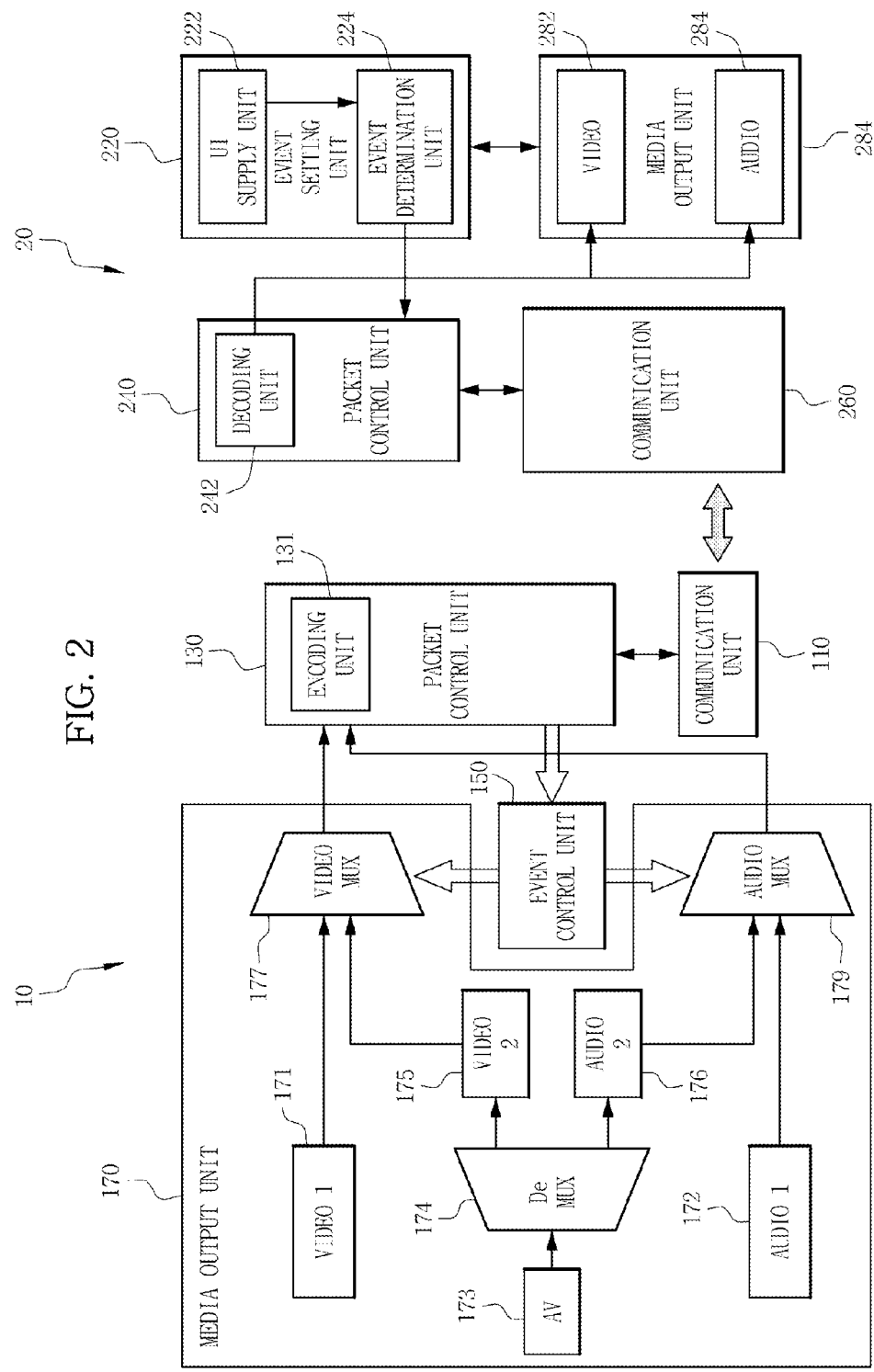

FIG. 5

| Field | Size(Octet) | Value |
|---|---|---|
| Generic Input Type ID | 1 | 200 : Vibration |
| Length | 2 | |
| Describe | | |
| Vibration ON/OFF | 1 | Vibration enable bit<br>0x00 : OFF(default) 0x01 : ON |
| Duration | 2 | Number of msec for vibration |

FIG. 6

| Field | Size(Octet) | Value |
|---|---|---|
| Generic Input Type ID | 1 | 201 : Screen rotation |
| Length | 2 | |
| Describe | 1 | Screen rotation enable bit<br>0x00 : OFF(default) 0x01 : ON |
| Direction | 1 | Vertical : 0x00 Horizontal : 0x01 |

FIG. 7

| Field | Size(Octet) | Value |
|---|---|---|
| Generic Input Type ID | 1 | 202 : Volume up/down |
| Length | 2 | |
| Describe | 2 | B15B14; Volume control on/off<br>0x00 : OFF(default) 0x01 : ON<br>B13 : Volume direction indication bit<br>0b0 : volume down<br>0b0 : volume up<br>B0~B12 : Number of volume bits |
| Volume control | | |

330

331 — Generic Input Type ID
333 — Length
335 — Describe

SINK DEVICE, SOURCE DEVICE AND METHOD FOR CONTROLLING THE SINK DEVICE

CROSS-REFERENCE TO RELATED APPLICATION

This application claims priority to and the benefit under 35 U.S.C. §119 of Korean Patent Application No. 10-2012-0150640, filed on Dec. 21, 2012, and all the benefits accruing therefrom, the contents of which in its entirety are herein incorporated by reference.

BACKGROUND

Field

Exemplary embodiments relate to a sink device, a source device, a Wireless Local Area Network (WLAN) system, and a method for controlling the sink device, and more particularly, a sink device, a source device, a WLAN system, and a method for controlling the sink device capable of performing WLAN-based display.

Description of the Background

In recent years, with development of electronic and communication technologies, technologies using wireless communication technologies have tended to be widely used not only in the field of communication, but also in all the industry fields, including the field of service. Accordingly, a variety of services, such as, voice call, data transmission, and the Internet have been provided based on wireless networks. Examples of the representative wireless communication technologies based on wireless communication networks include Wireless Broadband Internet (WiBro) and Wi-Fi (wireless local area network (WLAN) products that are based on the Institute of Electrical and Electronics Engineers' (IEEE) 802.11 standards).

The Wi-Fi is one of the short-range wireless communication technologies based on the IEEE 802.11 standard and is a WLAN technology capable of enabling high-performance wireless communication by integrating a wireless technology with High Fidelity (Hi-Fi). The WLAN technology refers to a scheme of constructing a network using radio waves, infrared rays, or the like without use of wired lines when the network is constructed.

When such a Wi-Fi technology is used, portable computers such as notebook type computers can be wirelessly connected to be used in a neighborhood place. When the Wi-Fi technology is used, a plurality of PCs can be connected and thus large-capacity files, graphics, videos, and audio files can be transmitted.

In recent years, users could have make connection of Wi-Fi using not only portable computers, such as notebook type computers that use Wi-Fi, but also smartphones.

A device, such as, a smartphone or a PC, which displays a screen using the Wi-Fi communication, is referred to as a Wi-Fi display device. In particular, a Wi-Fi display device that supplies display information is referred to as a source device and a Wi-Fi display device that receives the display information is referred to as a sink device.

However, such a sink device mirrors only a screen uniformly supplied from the source device without reflection of a user's request or a use environment of the sink device and displays only the same screen as that of the source device.

Accordingly, there is a demand for a configuration capable of controlling event transmission of a source device in accordance with a use environment of the sink device.

Further, there is a demand for a method for blocking undesired events of users or receiving only desired events.

SUMMARY

Exemplary embodiments of the present invention provide a sink device capable of being independently controlled and a source device capable of independently controlling the sink device. Exemplary embodiments of the present invention provide a WLAN system including the source device or the sink device. Exemplary embodiments of the present invention provide a method for controlling the sink device.

The sink device, the source device, the WLAN system, and the method for controlling the sink device, the sink device may generate a control event configured to control the media data supplied from the source device and independently control the sink device. Since the control event generated by the sink device is transmitted to the source device using, for example, a User Input Back Channel (UIBC) packet, the user may use the sink device efficiently and conveniently.

Additional features of the invention will be set forth in the description that follows, and in part will be apparent from the description, or may be learned by practice of the invention.

Exemplary embodiments of the present invention disclose a sink device including: an event setting unit configured to set a control event configured to control media data supplied from a remote source device with which the sink device communicates through a network; a packet control unit configured to form a control packet that controls media data from the source device; a communication unit configured to transmit the control packet to the source device and to receive, from the source device, media data that reflects the control event; and a media output unit configured to output the media data that reflects the control event.

Exemplary embodiments of the present invention disclose a method utilizing a processor, the method including: setting a control event to control media data supplied from a remote source device with which a sink device communicates through a network; forming a control packet that controls media data from the source device; transmitting the control packet to the source device; receiving, from the source device, media data that reflects the control event; and outputting, with the processor, the media data that reflects the control event.

Exemplary embodiments of the present invention disclose a Wireless Local Area Network (WLAN) system including: a source device configured to encode media data; and a sink device, including: an event setting unit configured to set a control event configured to control media data supplied from a remote source device with which the sink device communicates through a wireless network, a packet control unit configured to form a control packet that controls media data from the source device, a communication unit configured to transmit the control packet to the source device and to receive, from the source device, media data that reflects the control event, and a media output unit configured to output the media data that reflects the control event.

Exemplary embodiments of the present invention disclose a source device including: a communication unit configured to receive a control packet from a remote sink device through a network; an event control unit configured to set a control event configured to control media data supplied to the remote sink device; and a media output unit configured to output the media data that reflects the control event, wherein the communication unit is further configured to transmit the media data that reflects the control event to the remote sink device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 is a block diagram illustrating a WLAN system according to exemplary embodiments of the present disclosure.

FIG. 5, FIG. 6 and FIG. 7 are diagrams illustrating a UIBC packet according to exemplary embodiments.

DETAILED DESCRIPTION

Figure 1:
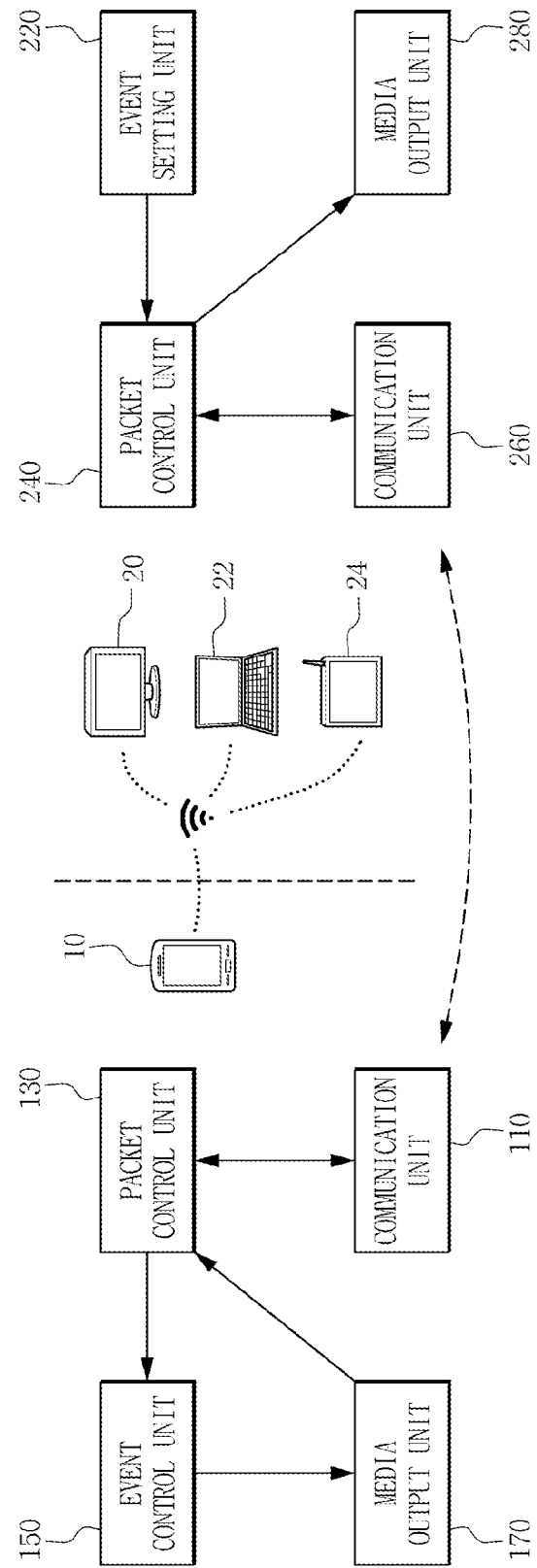
FIG. 1 is a block diagram illustrating a WLAN system according to exemplary embodiments of the present disclosure.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of a sink device and a source device based on a WLAN, a WLAN system, and a method for controlling the sink device will be described in more detail with reference to the accompanying drawings.

FIG. 1 is a block diagram illustrating a WLAN system according to exemplary embodiments of the present disclosure. Referring to FIG. 1, a WLAN system 1 may include a source device 10 and at least one of sink devices 20, 22, and 24 separate from the source device 10. Hereinafter, the description will be made using the representative sink device 20 to facilitate the description.

For example, the source device 10 and the sink device 20 may be WFD (Wi-Fi display) devices and communicate with each other through a WLAN. The sink device 20 outputs media data supplied from the source device 10. The WLAN is a scheme capable of realizing high-speed Internet within a given distance using radio waves, infrared rays, or the like without use of wired lines and may include all of the short-range wireless communication technologies, such as, Wi-Fi (wireless local area network (WLAN) products that are based on the Institute of Electrical and Electronics Engineers' (IEEE) 802.11 standards). Examples of the media data include video data, audio data, and vibration data.

The source device 10 may include a variety of mobile terminals, such as smartphones, cellular phones, tablet computers, net-books, Personal Digital Assistants (PDAs), and Personal Media Players (PMPs). The source device 10 can execute a variety of application programs based on an OS (operating system).

An Operating System (OS) is a system program that enables an application program to use hardware of a computer. The operating system may include all kinds of operating systems, such as, ANDROID OS, IOS, WINDOW MOBILE OS, BADA OS, SYMBIAN OS, BLACKBERRY OS, which can be provisioned on mobile terminals.

An application program is a program that is developed to execute a specific task using a computer. The application program may include not only a variety of applications but also a variety of multimedia content, such as, games, moving images, and photos, and execution programs, such as, image viewers and moving image players executing the multimedia contents.

The sink device 20 may include various kinds of display devices, such as, mobile terminals, desktop computers, monitors, and smart TVs, that are capable of receiving data from the source device 10. The sink device 20 may include a display (not shown) to display the data or a portion thereof.

The sink device 20 transmits a control event to the source device 10 that supplies media data and independently controls the media data to be output from the sink device 20. The source device 10 reflects the control event to source data of the media data rather than the same media data output by the source device 10 and transmits the source data to the sink device 20.

The sink device 20 includes an event setting unit 220, a packet control unit 240, a communication unit 260, and a media output unit 280 (see also FIG. 2).

FIG. 2 is a block diagram illustrating a WLAN system according to embodiments of the present disclosure.

The event setting unit 220 sets a control event configured to control the media data supplied from the source device 10. The event setting unit 220 includes a UI supply unit 222 that supplies an UI configured to set the control event and an event determination unit 224 that determines a kind of the control event according to a user's input.

The UI supply unit 222 may supply a menu in a user interface (UI) so that the user can understand and select the control event to control the sink device 20. The control event may be at least one of a vibration control event, a screen rotation control event, a sound volume control event, and a process recognition control event.

The menu may be configured to select permission (selectively permit or enable) or non-permission (deny or disable) of an event generated in the sink device 20, that is, perform control such that an operation of each event is turned on or off. The menu may perform control by UP or DOWN, or toggling each event in a grouping or independently.

Figure 3A:
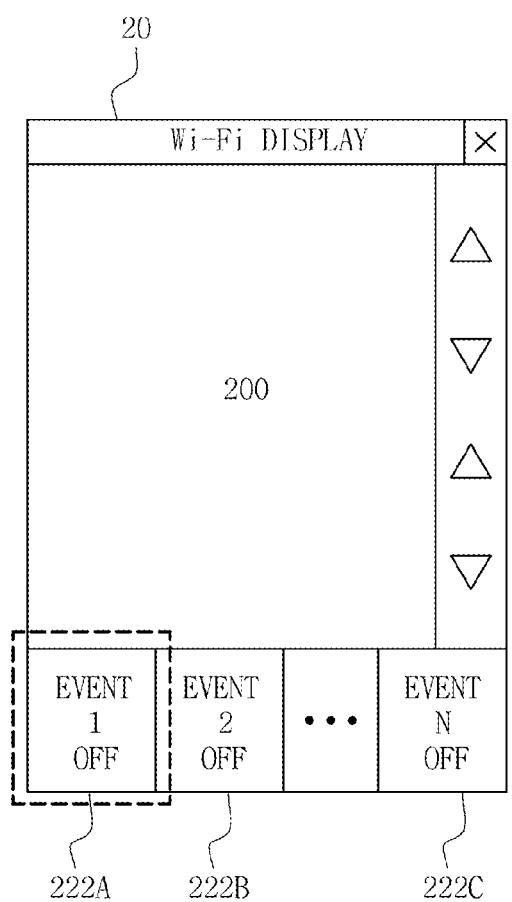
FIG. 3A and FIG. 3B are diagrams illustrating an exemplary User Interface (UI) structure for setting an event in the sink device according to exemplary embodiments of the present disclosure.
Figure 3B:
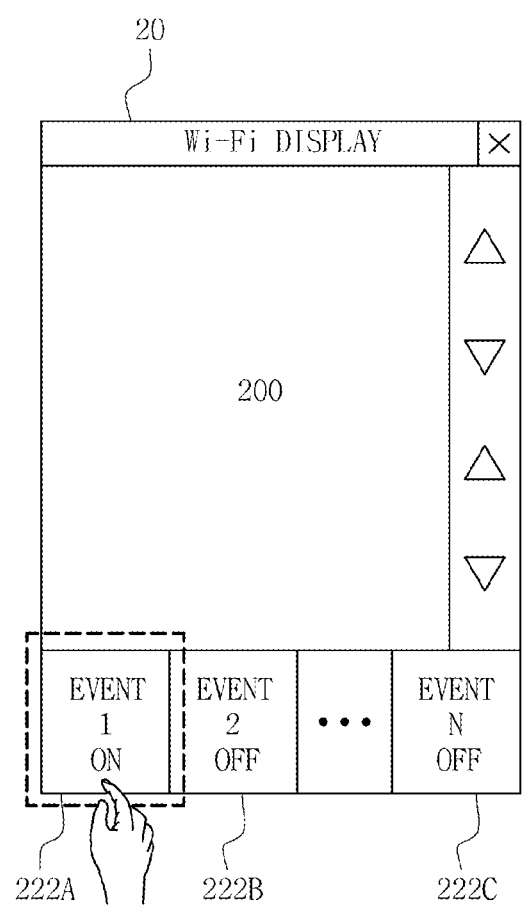

FIG. 3A and FIG. 3B are diagrams illustrating an exemplary User Interface (UI) structure for setting an event in the sink device according to embodiments of the present disclosure.

Referring to FIG. 3A, the UI supply unit 222 displays menus (222A to 222C) used to control each event on a display unit 200 of the sink device 20. In this case, as illustrated in FIG. 3B, the user may turn on or off, toggle the triggering or operation of event 1 by touching an ON/OFF menu 222A corresponding to event 1.

For example, the event control menu supplied by the UI supply unit 222 is an ON/OFF menu of a vibration operation, an ON/OFF menu of a screen rotation operation, and an UP/DOWN menu of a sound volume. The kinds of event control menu and a method for supplying the event control menu are not limited thereto, but may be supplied in various ways.

The event determination unit 224 determines a kind of control event according to a user's input through the UI supply unit 222 and notifies the packet control unit 240 of the kind of control event.

The packet control unit 240 forms a control packet configured to transmit the control event to the source device 10. The control packet may be formed as a User Input Back Channel (UIBC) packet.

The UIBC refers to a selective function of a Wi-Fi display and enables delivery of various user events, such as, a keyboard, a mouse, a touch, a key, and BLUETOOTH. The user events may include events generated in response to a user's input, events (process recognition control events) generated when, for example, a luminance sensor, a gyro sensor, a camera, or the like, senses a motion of a terminal, a motion of the user, or the like.

Figure 4:
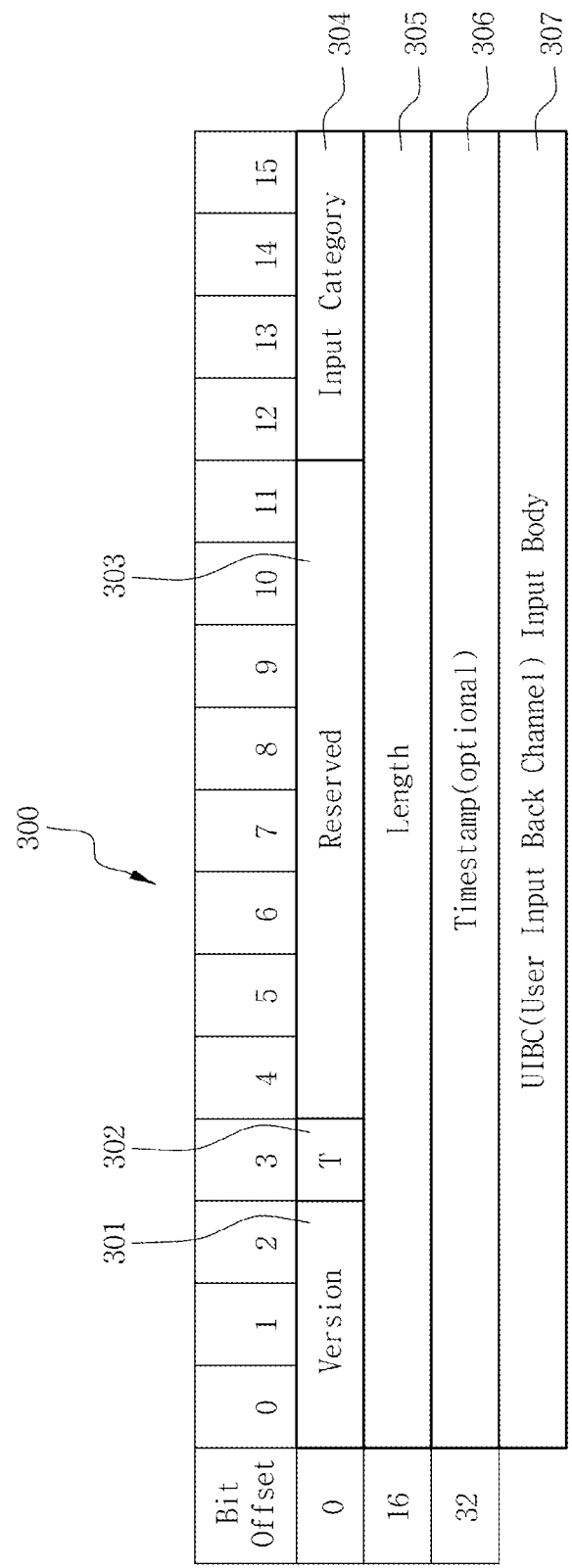
FIG. 4 is a diagram illustrating the structure of a User Input Back Channel (UIBC) packet.

FIG. 4 is a diagram illustrating the structure of a User Input Back Channel (UIBC) packet.

FIG. 4 illustrates the structure of a packet 300 necessary for UIBC communication. A Version field 301 is a region in which a protocol version is defined. The Version field 301 is filled with information, such as, 0x0b000, and may include 3-bits of information. A T field 302 is a region of a current timestamp. The T field 302 may include 1-bit of information. A Reserved field 303 is a reserved region and may, for example, include 8-bits of information.

An Input Category field 304 is a region in which it is determined whether a kind of event is a generic event or a human interface device class (HIDC) event and includes, for example, 4-bits of information. The generic event is a UIBC event, such as, a mouse or a key. The HIDC event is a UIBC event, such as, a touch, a mouse, or a keyboard having a path of BLUETOOTH, a USB or the like. The events used in the present disclosure may be the generic event.

A Length field 305 is a region in which the length of a Transmission Control Protocol (TCP) is defined and includes, for example, 8-bits of information. A Timestamp field 306 is a region in which a time is displayed to verify the fact that data is present at a given time. The Timestamp field 306 is optional.

A UIBC Input Body field 307 is a region in which a control packet to be delivered is defined in the present disclosure. Specifically, the packet control unit 240 forms the control packet by containing information on the control event set in the UIBC Input Body field 307 by the sink device 20.

FIG. 5, FIG. 6 and FIG. 7 are diagrams illustrating a UIBC packet according to exemplary embodiments.

FIG. 5 illustrates an example of the structure of a packet 310 configured to transmit the vibration control event. A Generic Input Type ID field 311 is a region in which the control event is identified. Any number may be selected from 9 to 255. The numbers 0 to 8 may be reserved. In the example of FIG. 5, the ID of the vibration control event is designated to 200.

In a Length field 313, the length of the packet 310 is defined. A Describe field 315 describes the details of the control event. Here, an octet indicates a bit (vibration enable bit) used to determine whether vibration is permitted.

For example, 0x00 is a default value for setting vibration OFF and 0x01 is a value for setting vibration ON. When a vibration event is received from the source device 10, 0x01 may be set. A vibration event UIBC packet received from the source device 10 may include a millisecond (msec) value to determine a vibration generation time.

When the vibration control event is used, the user of the sink device 20 may independently toggle or control ON/OFF of the vibration generated in the sink device 20. Accordingly, when the vibration event generated in the source device 10 is necessary and/or enabled, the vibration event may be selected to be generated in the sink device 20.

FIG. 6 illustrates an example of the structure of a packet 320 configured to transmit the screen rotation control event. The ID of the Generic Input Type ID field 321 is designated to have a value of 201.

In a Length field 323, the length of the packet 320 is defined. A Describe field 325 describes the details of the control event. There are ON (0x00) and OFF (0x01) items of the screen rotation event.

In other words, when the screen rotation event is set to ON (0x00), the screen rotation event generated in the sink device 20 is received and/or processed. When the rotation event is set to OFF (0x01), the screen rotation event generated in the sink device 20 is not received and/or processed. When the screen rotation event generated in the sink device 20 is received, the screen rotation event may include a direction value indicating a direction of screen rotation. Accordingly, when the screen rotation event generated in the source device 10 is necessary and/or enabled, the screen rotation event may be selected to be generated in the sink device 20.

In exemplary embodiments, the user of the sink device 20 may independently control the screen rotation generated in the sink device 20. For example, when the source device 10 is set to a vertical mode but the user desires the sink device 20 to be set to a horizontal mode, the user may give a request to the source device 10 using the control event.

FIG. 7 illustrates an example of the structure of a packet 330 configured to transmit the sound volume control event. The ID of a Generic Input Type ID field 331 is designated to 202.

In a Length field 333, the length of the packet 330 is defined. A Describe field 335 describes the details of the control event. A volume control value may be configured with a total of 16 bits. Here, the $14^{th}$ and $15^{th}$ bits may be ON/OFF values of volume control, the $13^{th}$ bit may be a value indicating division of a volume UP and a volume DOWN, and the $0^{th}$ to $12^{th}$ bits may indicate changed volume values.

When the volume control event is used, the user of the sink device 20 may independently control UP/DOWN of the sound volume generated in the sink device 20. Therefore, a sound volume output from the sink device 20 may directly be controlled separately from a sound output from the source device 10.

The communication unit 260 transmits a control packet generated by the packet control unit 240 to the source device 10 in conformity with a communication protocol used to communicate with the source device 10.

For example, when the source device 10 and the sink device 20 perform Wi-Fi direct communication, the communication unit 260 may include a Wi-Fi P2P/TDLS (Peer-to-Peer/Tunneled Direct Link Setup) block that performs connection to a Wi-Fi device, an IP block and a TCP (Transmission Control Protocol) block that take charge of an IP and transmission rules of the Wi-Fi device, a UIBC (User Input Back Channel) capsulation block that delivers a user event, a Generic block that takes charge of a general user event, and a HIDC (Human Interface Device Class) block that takes charge of an event having a path of BLUETOOTH, a USB, or the like. The configuration of the communication unit 260 may be configured, as necessary, and may conform to a communication standard.

Figure 8:
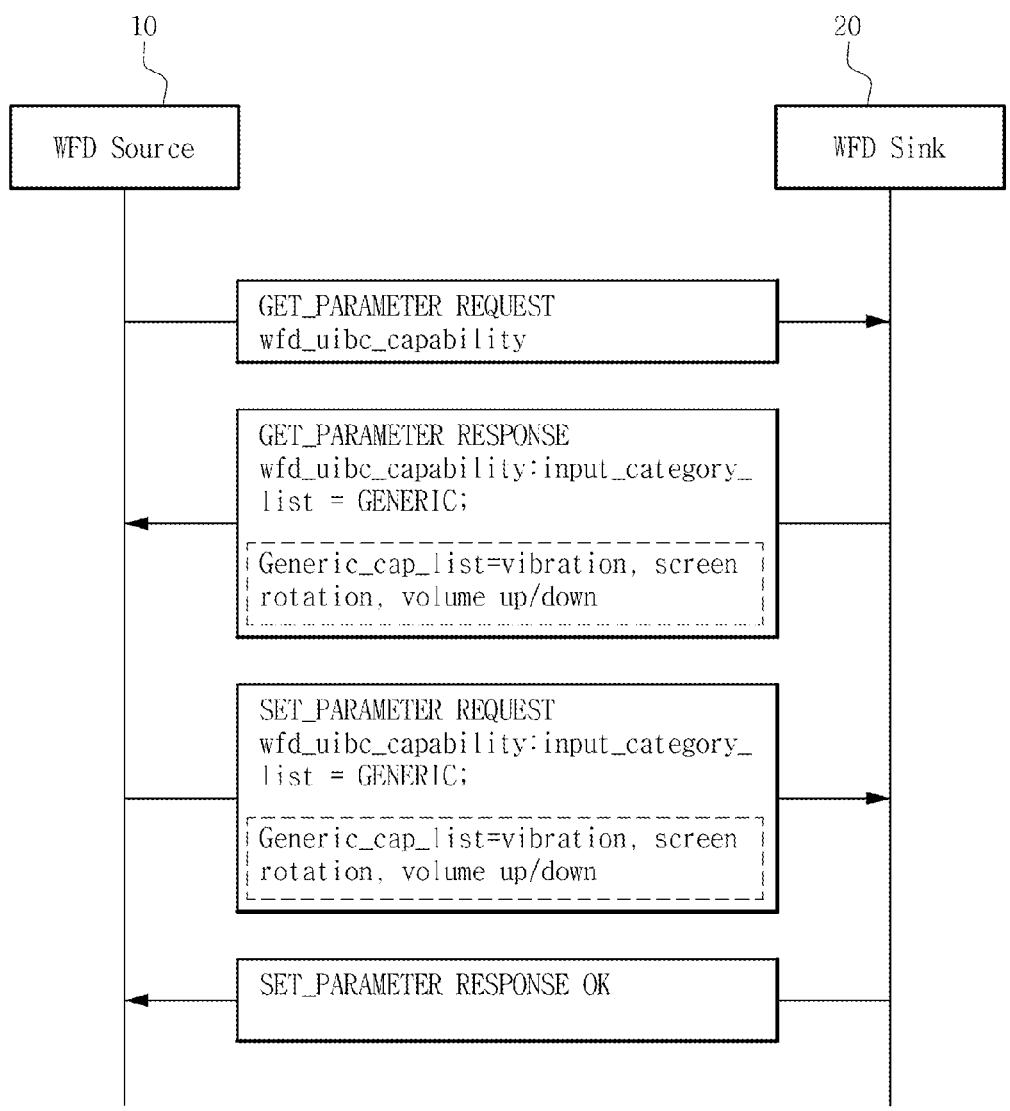
FIG. 8 is a diagram illustrating a message transmission when a source device and a sink device are connected to each other according to exemplary embodiments.

FIG. 8 is a diagram illustrating a message transmission when a source device and a sink device are connected to each other according to exemplary embodiments.

FIG. 8 illustrates a UIBC establishment process after Wi-Fi communication is performed between the sink device 20 (WFD Sink) and the source device 10 and negotiation is performed. In the present disclosure, when the source device 10 transmits a parameter request message (GET_PARAMETER REQUEST) to the sink device 20, the source device 10 transmits an event item (wfd_uibc_capability) on which UIBC control can be performed.

In response to the parameter request message, the sink device 20 transmits a response message (GET_PARAMETER RESPONSE) and transmits an event value (generic_cap_list) to be controlled together. The source device 10 fills the event value (generic_cap_list) to be controlled together with the parameter setting request message (SET_PARAMETER REQUEST) with the details (for example, a port number and whether or not enable) and transmits the event value to the sink device 20.

The UIBC is established between both devices, when the sink device 20 transmits an OK response message (SET_PARAMETER RESPONSE OK) in order to inform the source device 10 of the reception of the parameter setting request message (SET_PARAMETER REQUEST) transmitted by the source device 10.

Figure 9:
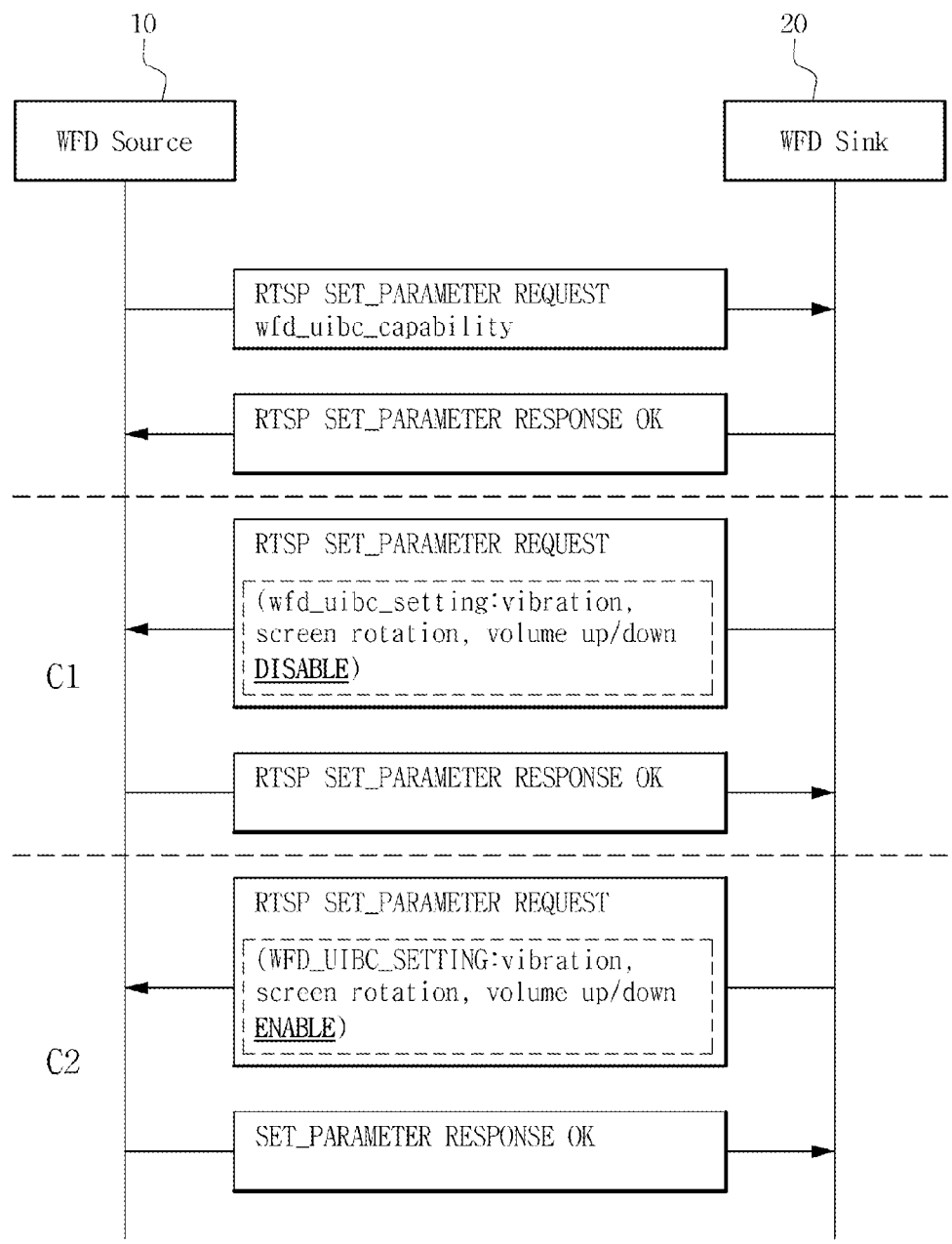
FIG. 9 is a diagram illustrating a message transmission when there is an update between a source device and a sink device according to exemplary embodiments.

FIG. 9 is a diagram illustrating a message transmission when there is an update between a source device and a sink device according to exemplary embodiments.

FIG. 9 illustrates a case in which there is an update factor to the source device and the sink device in FIG. 1.

The source device 10 (WFD Source) transmits a real time streaming protocol parameter request message (RTSP SET_PARAMETER REQUEST) to the sink device 20. Then, the sink device 20 (WFD Sink) transmits a response message (RTSP SET_PARAMETER RESPONSE OK).

Thereafter, when a control event is generated in the sink device 20, the sink device 20 responds to the real time streaming protocol parameter request message and transmits a real time streaming protocol parameter setting request message (RTSP SET_PARAMETER REQUEST).

A first case (C1) is a case in which a result of an event to be controlled is set not to be permitted (disabled). A second case (C2) is a case in which the result of an event to be controlled is set to be permitted (enabled) is illustrated. In this case, the source device 10 transmits an event value (wfd_uibc_setting) to which permission or non-permission of the event is indicated.

The source device 10 receives the event value (wfd-uibc-setting) to which the permission or non-permission of the event is indicated, and then transmits a confirmation message (SET_PARAMETER RESPONSE OK) to the sink device 20.

The source device 10 receiving the control event from the sink device 20 applies the request contents of the control event to the media data and transmits the media data to the sink device 20. The media data is transmitted in a packet form.

The communication unit 260 receives the media data transmitted by the source device 10 and delivers the media data to the packet control unit 240.

The packet control unit 240 analyzes a packet of the media data. The packet control unit 240 may include a decoding unit 242 that decodes the media data. The packet control unit 240 outputs the decoded media data to the media output unit 280.

Thus, the media output unit 280 outputs the media data that reflects the control event. Specifically, when the media data is video data, the sink device 20 displays a video and plays an accompanying audio, when available, on the display unit 200. When the media data is audio data, the sink device 20 may supply a sound through a speaker.

The media output unit 280 may include a video unit 282 that stores the video data to be displayed as a screen of the sink device 20 and an audio unit 284 that stores the audio data to be output as an audio to the sink device 20.

For example, while the user is playing a game using the sink device 20, the user may not desire to feel vibration generated by a notification, for example, a telephone call in the source device 10. In this case, the user may set the vibration to be turned off in the sink device 20, and thus a control packet indicating the contents in which the vibration is turned off is formed and transmitted to the source device 10.

Thus, the source device 10 transmits, to the sink device 20, the media data to which the vibration event is not reflected. That is, even when vibration is generated in the source device 10, independent control may be performed such that no vibration is generated in the sink device 20.

As another example, while the user is viewing a movie using the sink device 20, the user may not desire the screen of the sink device 20 to be rotated with automatic rotation of the screen of the source device 10 in some cases. In this case, the user may set the screen rotation to be turned off in the sink device 20, and thus a control packet indicating the contents in which the screen rotation is turned off is formed and transmitted to the source device 10.

Thus, the source device 10 transmits, to the sink device 20, the media data to which the screen rotation event is not reflected. That is, even when the screen is rotated in the source device 10, independent control may be performed such that the screen of the sink device 20 is not rotated.

As still another example, while the user is viewing a movie using the sink device 20, the user desires to fix a sound volume in some cases. In this case, the user may set the volume to be fixed in the sink device 20, and thus a control packet indicating the contents in which the volume is fixed is formed and transmitted to the source device 10. Thus, even when the volume UP or DOWN is performed in the source device 10, independent control may be performed such that there is no influence on the volume of the sink device 20.

When the user desires to independently control the sound of the sink device 20, the user may set the volume UP/DOWN in the sink device 20, and thus a control packet indicating the contents of the volume UP/DOWN is formed and transmitted to the source device 10.

Thus, the source device 10 transmits, to the sink device 20, the media data to which a volume UP/DOWN event transmitted by the sink device 20 is reflected, irrespective of a volume UP/DOWN event generated in the source device 10. Specifically, the source device 10 analyzes the control packet. When the control packet has the contents of the volume UP/DOWN event, the source device 10 reflects the control event to source data of the media data rather than the media data output by the source device 10, encodes the media data, and transmits the media data to the sink device 20.

In this case, in the related art, when the volume is set to 0 in the source device 10, the control event is not reflected to an output of the media data of the sink device 20 in spite of the fact that the volume UP is performed in the sink device 20 such that the sink device 20 outputs the media data with a volume of 0 as well. However, according to the present disclosure, the volume of the sink device 20 may be controlled irrespective of the setting of the volume in the source device 10.

Accordingly, the sink device 20 does not operate as a device subordinate to the source device 10, but may operate as an independent device since the sink device 20 sets the control event according to a user's request or a use environment and transmits the control event to the source device 10.

In the present disclosure, the source device 10 receives a control event from the sink device 20, transmits the media data that reflects the control event to the sink device 20, and controls the sink device 20 independent of the corresponding control events on the source device 10.

Accordingly, the source device 10 includes a communication unit 110, a packet control unit 130, an event control unit 150, and a media output unit 170.

The communication unit 110 receives a control packet transmitted by the sink device 20 in conformity with a communication protocol used to communicate with the sink device 20 and delivers the control packet to the packet control unit 130. The packet control unit 130 receives and analyzes the control packet, and then outputs the contents of the control event to the event control unit 150.

The event control unit 150 executes the control event and controls the media data supplied by the media output unit 170. That is, the media output unit 170 outputs the media data that reflects the control event.

For example, the media output unit 170 includes a first video unit 171 that stores video data to be displayed as a screen, a first audio unit 172 that stores audio data to be output as an audio, an AV unit 173 that stores data in which the video and the audio are combined, a demultiplexer (DeMUX) unit 174 that separates the data in which the video and the audio are combined into the video data and the audio data, a second video unit 175 that stores the video data separated by the demultiplexer unit 174, and a second audio unit 176 that stores the audio data separated by the demultiplexer unit 174.

The media output unit 170 includes a video multiplexer (video MUX) unit 177 and an audio multiplexer (audio MUX) unit 179. The video multiplexer unit 177 takes charge of, for example, size setting according to a screen size and control according to screen rotation, and integrates and processes the video data output by the first video unit 171 and the second video unit 175. The audio multiplexer unit 179 integrates and processes the audio data output by the first audio unit 172 and the second audio unit 176.

In the related art, the processed data output by the video multiplexer 177 and the audio multiplexer unit 179 are output to a media data unit (not illustrated) of the source device 10 and the sink device 20.

In the present disclosure, however, source data before the output from the video multiplexer unit 177 and the audio multiplexer 179 are controlled by the event setting unit 220, and then are output to the sink device 20. The source data refer to media data output from the first video unit 171, the second video unit 175, the first audio unit 172, and the second audio unit 176.

For example, when a screen rotation control event is received from the sink device 20, the event control unit 150 delivers a command to the video multiplexer unit 177. Accordingly, the video multiplexer unit 177 outputs, to the packet control unit 130, video data of an original state rather than the video data converted such that a screen is rotated, even when a screen direction of the source device 10 is rotated.

When the screen direction of the source device 10 is not rotated but a screen rotation request event is received from the sink device 20, source data of an original state rather than the video data to be output to the source device 10 is rotated and output to the packet control unit 130. Accordingly, a screen rotation mode of the sink device 20 may independently be controlled without an influence of the screen rotation of the source device 10.

Likewise, when a volume control event is received from the sink device 20, the event control unit 150 delivers a command to the audio multiplexer unit 179. Accordingly, the audio multiplexer unit 179 outputs, to the packet control unit 130, audio data of an original state rather than audio data converted such that the volume UP/DOWN of the source device 10 is performed, even when the volume UP/DOWN of the source device 10 is performed.

When the volume of the source device 10 is fixed but a volume adjustment request event is received from the sink device 20, the volume of source data of an original state rather than the audio data to be output to the source device 10 is adjusted and output to the packet control unit 130. Accordingly, the volume of the sink device 20 may independently be controlled without an influence of the volume of the source device 10.

The packet control unit 130 forms a packet configured to transmit, to the sink device 20, the media data to which the above-described event is reflected. The control packet may be formed as a UIBC (User Input Back Channel) packet. The packet control unit 130 may include an encoding unit 131 that encodes the media data.

The communication unit 110 transmits the media data formed as the packet to the sink device 20. Thus, apart from the media data output by the source device 10, the source device 10 may transmit the independent media data to the sink device 20 according to the control event set by the sink device 20.

In the WLAN system 1 of FIG. 1, the source device 10, and the sink device 20 according to exemplary embodiments, a control event requested from the sink device 20 is set and transmitted to the source device 10. Therefore, the media data supplied to the sink device 20 may independently be controlled according to a use environment of the sink device 20 and a user's request.

Accordingly, the sink device 20 may be used efficiently and conveniently. Since an event formed in the sink device 20 is transmitted to the source device 10 using the UIBC packet, the present disclosure may be realized economically and easily.

Figure 10:
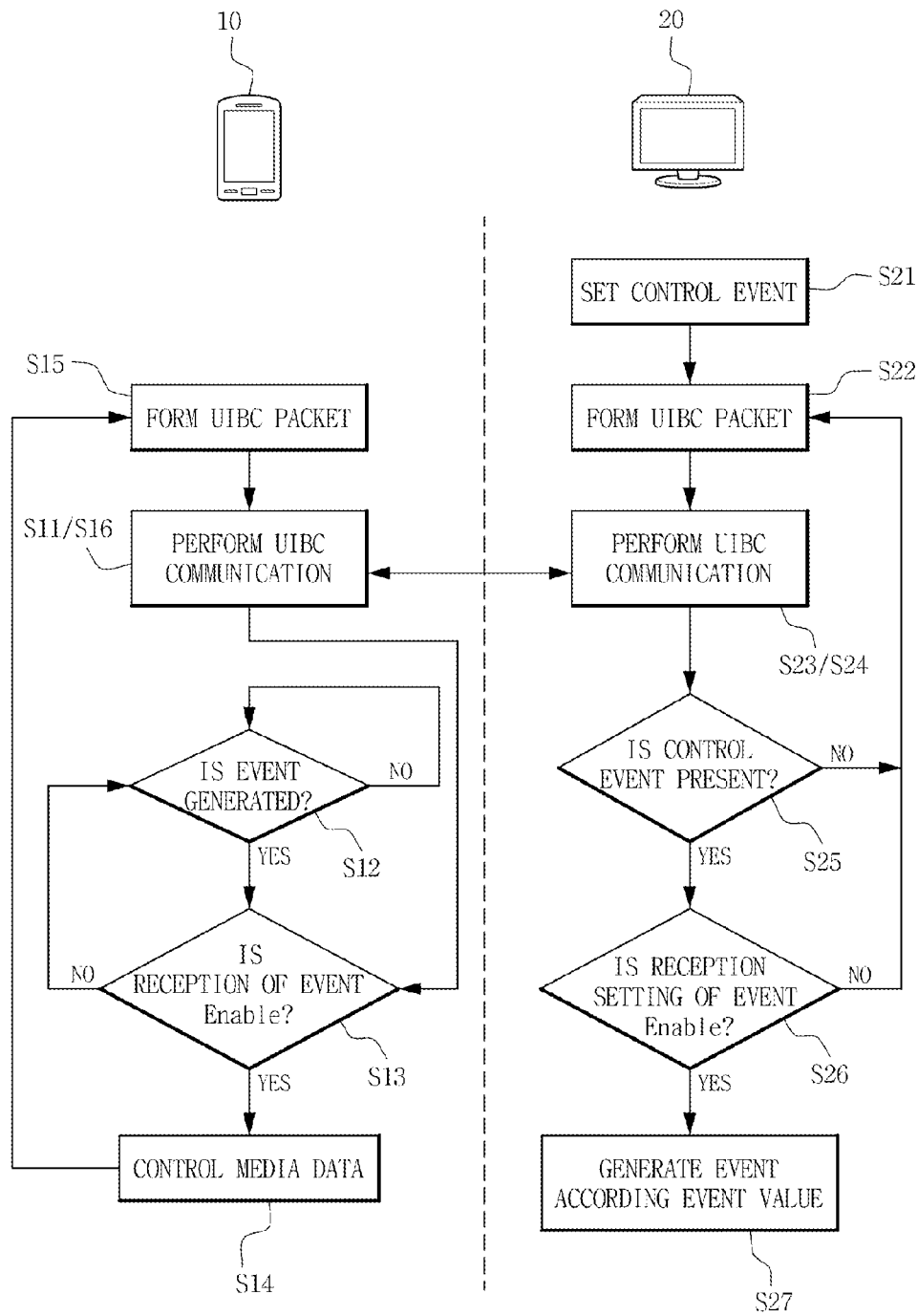
FIG. 10 is a flowchart illustrating a method for controlling a sink device according to exemplary embodiments of the present disclosure.

FIG. 10 is a flowchart illustrating a method for controlling a sink device according to exemplary embodiments of the present disclosure.

The method for controlling the sink device according to exemplary embodiments may be performed in substantially the same configurations as those of the source device 10 and the sink device 20 of the WLAN system 1 in FIG. 1. Accordingly, the same reference numerals are given to the same constituent elements as those of the source device 10 and the sink device 20 in FIG. 1, and the repeated description will be omitted.

Referring to FIG. 10, in the method for controlling the sink device according to exemplary embodiments, the sink device 20 sets a control event configured to control media data supplied from the source device 10 (operation S21). In the control event, permission (enable) or non-permission (disable) of the event generated in the source device 10 may be set. An event generated in the sink device 20 may independently be adjusted as well.

The set control event is formed as a control packet to be transmitted to the source device 10 (operation S22). The control packet may be formed as the UIBC (User Input Back Channel) packet. The control packet is transmitted to the source device 10 through UIBC communication (operation S23).

The source device 10 receives the control packet through the UIBC communication (operation S11) and monitors whether an event generated by an operation of the user or the like is generated in the source device 10 (operation S12). When the event is generated in the source device 10, the sink device 20 determines whether to permit reception and fulfillment/completion of the requested event (operation S13).

When the sink device 20 permits the reception of the event, the event is reflected to the media data to be supplied to the sink device 20 and the media data is output (operation S14). The media data to which the event is reflected is formed using the UIBC packet (operation S15) and is transmitted to the sink device 20 (operation S16).

The sink device 20 receives and outputs the media data to which the event is reflected through the UIBC communication (operation S24).

The sink device 20 may check whether the event is generated. Specifically, when the event generated in the source device 10 is transmitted to the sink device 20, the sink device 20 confirms whether the set control event is present (operation S25). When the set control event is present, the sink device 20 confirms whether to permit the reception of the event (operation S26). When the sink device 20 permits the reception of the event, the sink device 20 generates the event (operation S27).

Figure 11:
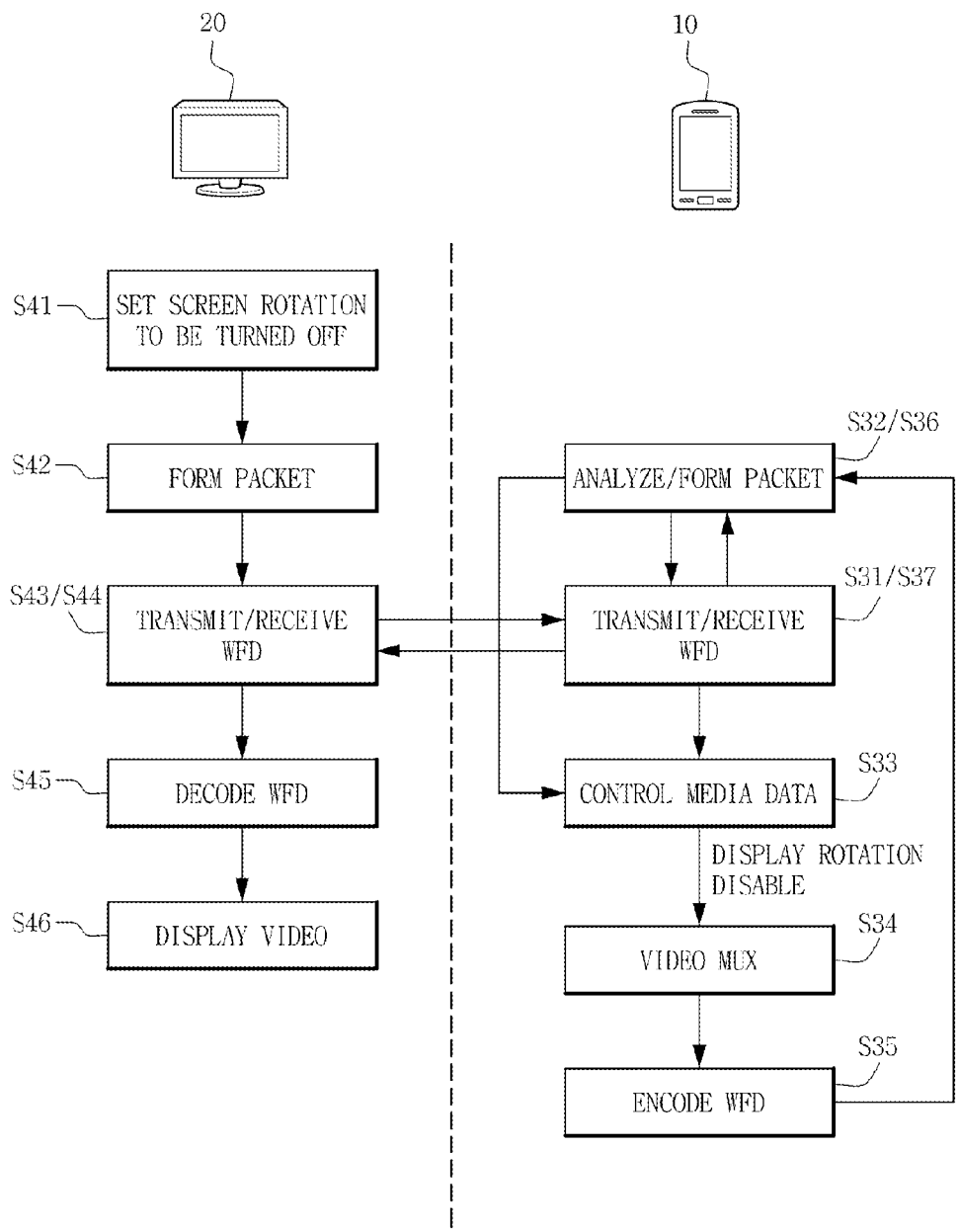
FIG. 11 is a flowchart illustrating a sink device transmitting an event configured to control screen rotation to the source device according to exemplary embodiments.
Figure 12:
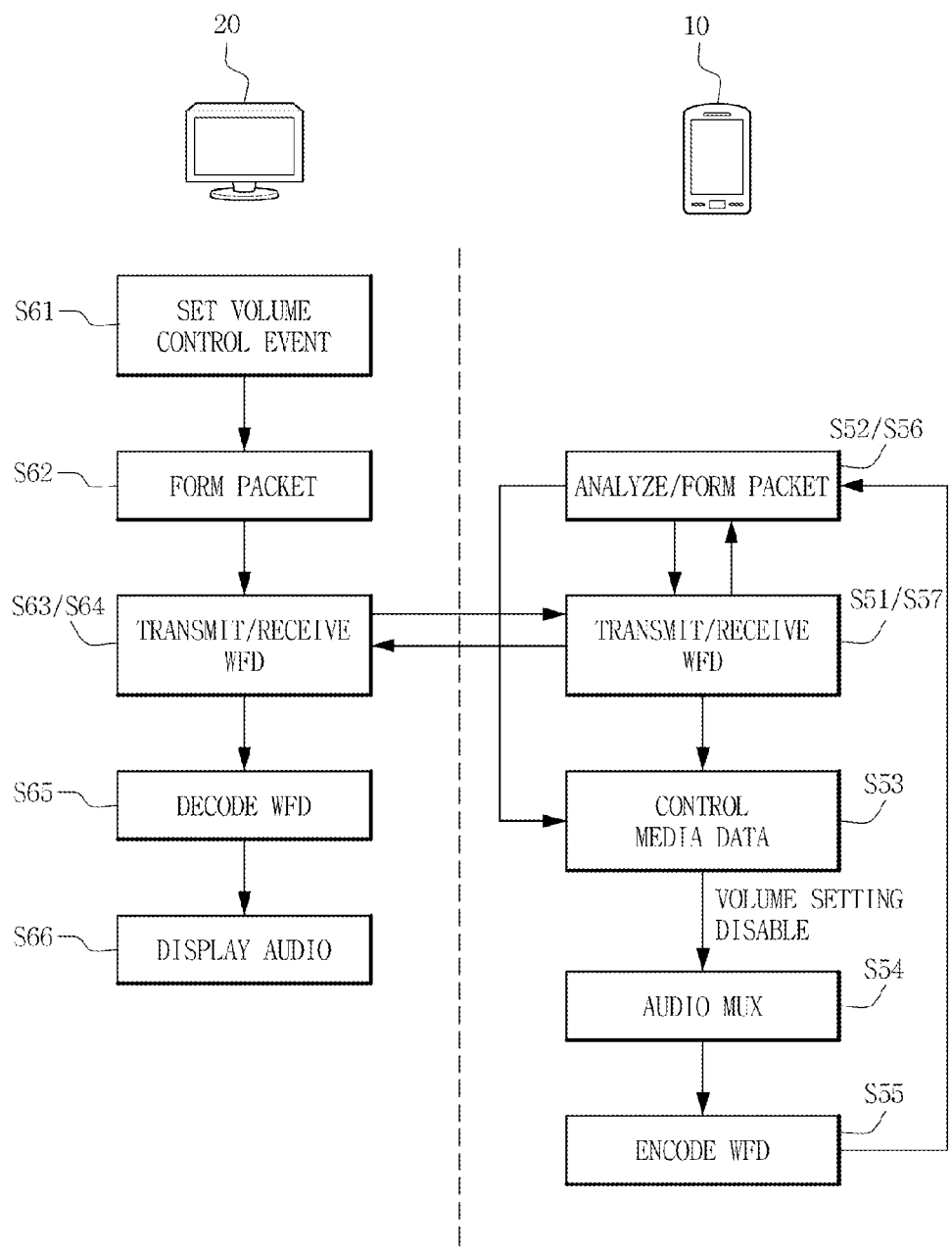
FIG. 12 is a flowchart illustrating a sink device transmitting an event configured to control a sound volume to the source device according to exemplary embodiments.

FIG. 11 is a flowchart illustrating a sink device transmitting an event configured to control screen rotation to the source device according to exemplary embodiments. FIG. 12 is a flowchart illustrating a sink device transmitting an event configured to control a sound volume to the source device according to exemplary embodiments. FIG. 11 and FIG. 12 illustrate examples in which a specific control event in FIG. 10 is applied.

Referring to FIG. 11, the sink device 20 sets the screen rotation to be turned off (operation S41). In exemplary embodiments, the screen rotation generated in the sink device 20 may be adjusted independently of the screen rotation of the source device 10.

The set control event is formed as a control packet to be transmitted to the source device 10 (operation S42). The control packet is transmitted to the source device 10 (operation S43).

The source device 10 receives the control packet (operation S31) and analyzes the control event (operation S32). Subsequently, to execute the analyzed control event, the media data is controlled according to a rotation-disabled event (operation S33).

The source data of the video data is multiplexed by reflecting the control event (operation S34) and the video data that reflects the control event is encoded (operation S35). The encoded video data is formed as a packet (operation S36) and is transmitted to the sink device 20 (operation S37).

The sink device 20 receives the video data (operation S44) and decodes the video data (operation S45). Then, the sink device 20 displays a video (operation S46).

Referring to FIG. 12, the sink device 20 sets a volume control event (operation S61). The volume control event may be an event configured such that UP/DOWN of a volume to be output is arbitrarily performed in the sink device 20 or may be an event configured such that UP/DOWN of the volume of the source device 10 is not reflected.

The set event is formed by a control packet to be transmitted to the source device 10 (operation S62). The control packet is transmitted to the source device 10 (operation S63).

The source device 10 receives the control packet (operation S51) and analyzes the control event (operation S52). Subsequently, to execute the analyzed control event, the media data is controlled according to the volume control event (operation S53).

The source data of the audio data is multiplexed by reflecting the control event (operation S54) and the audio data that reflects the control event is encoded (operation S55). The encoded audio data is formed by a packet (operation S56) and is transmitted to the sink device 20 (operation S57).

The sink device 20 receives the audio data (operation S64) and decodes the audio data (operation S65). Then, the sink device 20 outputs an audio (operation S66).

According to exemplary embodiments of the method for controlling the sink device, an event necessary in the sink device 20 is set and transmitted to the source device 10. Therefore, the media data provided to the sink device 20 may independently be controlled according to the use environment of the sink device 20 and a user's request.

Accordingly, the sink device 20 may be used efficiently and conveniently. Since an event generated in the sink device 20 is transmitted to the source device 10 using the UIBC packet, the present disclosure may be realized economically and easily.

Although the present invention has been described with reference to the embodiments shown in the drawings, these embodiments are illustrative only and those skilled in the art will appreciate that various modifications, additions and substitutions are possible, without departing from the technical protection scope of the present invention. Therefore, the true technical protection scope of the present invention should be defined by the technical spirit of the appended claims.

What is claimed is:

1. A sink device, comprising:
    a display; and
    a wireless transceiver, wherein the sink device is configured to set a control event configured to control media data supplied from a source device with which the sink device communicates through a wireless communication, and to form a control packet that controls media data from the source device, the control packet comprising an input type identity (ID) field to identify a control event type and a value indicating an enablement or a disablement of an event indicated by the input type ID field,
    wherein the wireless transceiver is configured to transmit the control packet to the source device and to receive, from the source device, media data that reflects the control event, and
    wherein the display is configured to output at least part of the media data that reflects the control event.

2. The sink device of claim 1, further comprising an event generator configured to generate an event according to an event value included in the control packet.

3. The sink device of claim 1, further comprising a decoder configured to decode the media data.

4. The sink device of claim 1, wherein the wireless transceiver is further configured to receive a request from the source device, and the sink device is further configured to determine if an event associated with the request will be fulfilled.

5. The sink device of claim 4, wherein, after determining that the request will be fulfilled, the wireless transceiver is further configured to transmit a confirmation to the source device and to receive, from the source device, media data that reflects the control event.

6. The sink device of claim 1, wherein the wireless transceiver is further configured to receive media data from the source device and the media data comprises one or more of audio, video, and multimedia.

7. The sink device of claim 1, wherein the control packet sets a parameter request on the sink device independent of a corresponding parameter on the source device.

8. The sink device of claim 1, wherein the control packet sets a volume for the sink device, a screen rotation orientation for a sink device, or a vibration event for the sink device.

9. The sink device of claim 1, wherein the control packet comprises a User Input Back Channel (UIBC) packet.

10. A method utilizing a processor, the method comprising:
    setting a control event to control media data supplied from a source device with which a sink device communicates through a network;
    forming a control packet that controls media data from the source device, the control packet comprising an input type identity (ID) field to identify a control event type and a value indicating an enablement or a disablement of an event indicated by the input type ID field;
    transmitting the control packet to the source device;
    receiving, from the source device, media data that reflects the control event; and
    outputting, with the processor, the media data that reflects the control event.

11. The method of claim 10, further comprising generating an event according to an event value included in the control packet.

12. The method of claim 10, further comprising decoding the media data.

13. The method of claim 10, further comprising:
    receiving a request from the source device; and
    determining whether to fulfill an event associated with the request.

14. The method of claim 13, wherein, after determining that the request will be fulfilled, transmitting a confirmation to the source device to receive, from the source device, media data that reflects the control event.

15. The method of claim 10, further comprising receiving media data from the source device, wherein the media data comprises one or more of audio, video, and multimedia.

16. The method of claim 10, wherein the setting a parameter request on the sink device is independent of a corresponding parameter on the source device.

17. The method of claim 10, wherein the control packet sets a volume for the sink device, a screen rotation orientation for a sink device, or a vibration event for the sink device.

18. The method of claim 10, wherein the control packet comprises a User Input Back Channel (UIBC) packet.

19. A Wireless Local Area Network (WLAN) system, comprising:
    a source device configured to encode media data; and
    a sink device, comprising:
        a display; and
        a wireless transceiver, wherein the sink device is configured to set a control event configured to control media data supplied from the source device with which the sink device communicates through a wireless communication, and to form a control packet that controls media data from the source device, the control packet comprising an input type identity (ID) field to identify a control event type and a value indicating an enablement or a disablement of an event indicated by the input type ID field, wherein the wireless transceiver is configured to transmit the control packet to the source device and to receive, from the source device, media data that reflects the control event, and wherein the display is configured to output at least part of the media data that reflects the control event.

20. The system of claim 19, wherein the control packet sets a parameter request on the sink device independent of a corresponding parameter on the source device.

21. A source device, comprising:
a wireless transceiver configured to receive a control packet from a sink device through a wireless communication, the control packet comprising an input type identity (ID) field to identify a control event type and a value indicating an enablement or a disablement of an event indicated by the input type ID field;
an event controller configured to set, based on the received control packet, a control event configured to control media data supplied to the sink device; and
a media output provider comprising a video multiplexer and an audio multiplexer, the media output provider being configured to output the media data that reflects the control event,
wherein the wireless transceiver is further configured to transmit the media data that reflects the control event to the sink device.

22. The source device of claim 21, wherein the video multiplexer is configured to integrate and process video data according to a screen rotation and a screen size based on the control event set by the event controller.

23. The source device of claim 21, wherein the audio multiplexer is configured to integrate and process audio data from a plurality of audio units based on the control event set by the event controller.

24. The source device of claim 21, wherein the wireless transceiver is further configured to receive a request from the sink device, and the event controller is further configured to determine if an event associated with the request will be fulfilled.

25. The source device of claim 21, further comprising:
a packet controller configured to form a request that controls media data supplied from the source device,
wherein the wireless transceiver is further configured to transmit the request to the sink device and to receive, from the sink device, a confirmation of a setting of the control event, and the media output provider is configured to output the media data that reflects the request.

26. The source device of claim 21, wherein the wireless transceiver is further configured to transmit media data to the sink device and the media data comprises one or more of audio, video, and multimedia.

27. The source device of claim 21, wherein the control packet sets a parameter request on the sink device independent of a corresponding parameter on the source device.

28. The source device of claim 21, wherein the control packet sets a volume for the sink device, a screen rotation orientation for a sink device, or a vibration event for the sink device.

29. The source device of claim 21, wherein the control packet comprises a User Input Back Channel (UIBC) packet.

* * * * *